United States Patent [19]

Guthrie

[11] 4,391,226

[45] Jul. 5, 1983

[54] DOG LEASH

[76] Inventor: Richard A. Guthrie, 652 N. 94th Pl., Mesa, Ariz. 85207

[21] Appl. No.: 342,186

[22] Filed: Jan. 25, 1982

Related U.S. Application Data

[63] Continuation of Ser. No. 63,661, Sep. 10, 1979, abandoned, and Ser. No. 199,439, Oct. 22, 1980, abandoned.

[51] Int. Cl.³ ............................................. A01K 27/00
[52] U.S. Cl. ................................. 119/109; 24/132 R
[58] Field of Search ............. 119/109, 110; 24/132 R, 24/132 WL

[56] References Cited

U.S. PATENT DOCUMENTS

| | | | |
|---|---|---|---|
| 1,564,382 | 12/1925 | Treiman | 24/132 WL |
| 2,250,171 | 7/1941 | Wilkins | 119/109 |
| 3,644,966 | 2/1972 | Higgins | 24/132 R |
| 3,937,418 | 2/1976 | Critelli | 119/109 |
| 3,941,354 | 3/1976 | Paige | 24/132 R |
| 4,108,011 | 8/1978 | Chism | 24/132 WL |
| 4,269,150 | 5/1981 | McCarthy | 119/109 |

Primary Examiner—Jay N. Eskovitz

[57] ABSTRACT

A leash device having a housing through which a leash line passes. The housing contains a cam-type variable compression means for variably compressing the leash line against the inside of the housing. The compression means is in the form of a rotatable cylinder rotated by a thumb-operated lever extending outside the housing. The housing is designed to fit in the palm of the hand and has finger grooves and an extending nipple to prevent rope burn from the leash line.

10 Claims, 5 Drawing Figures

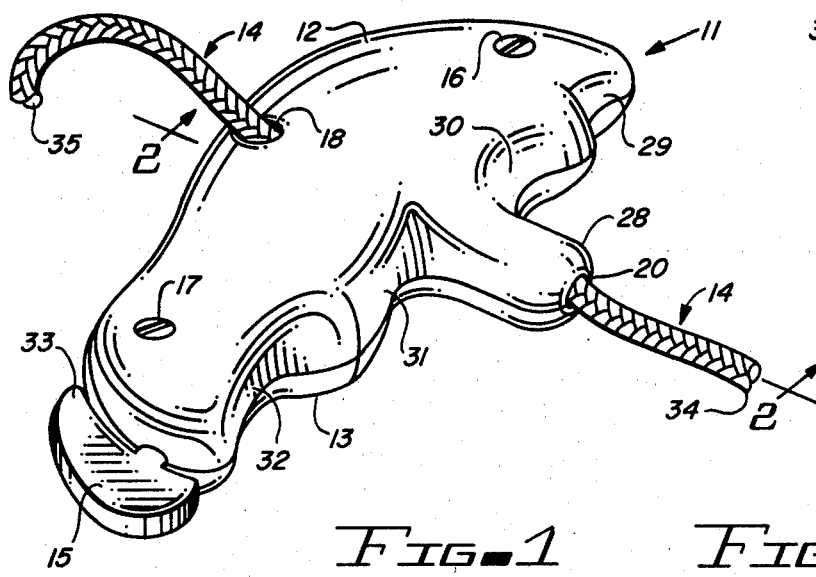
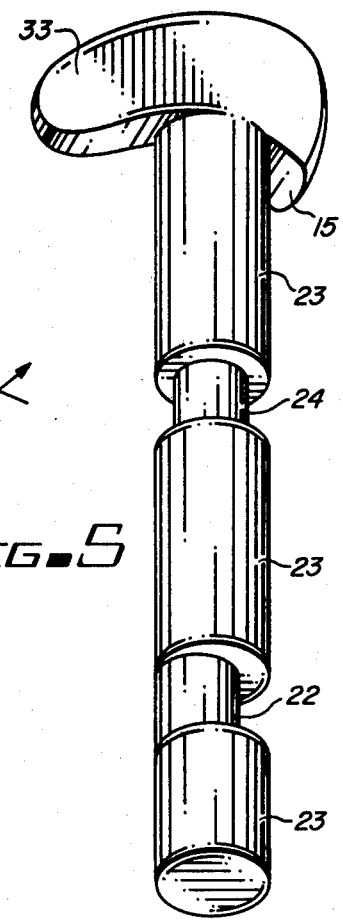
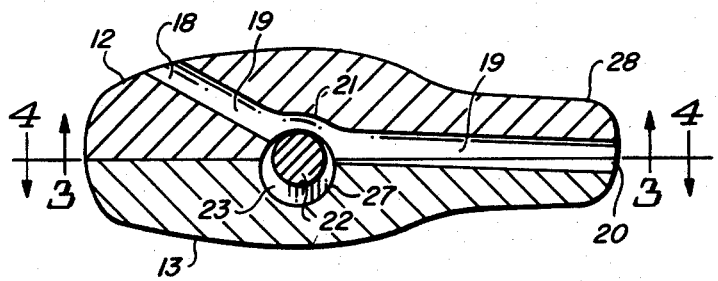
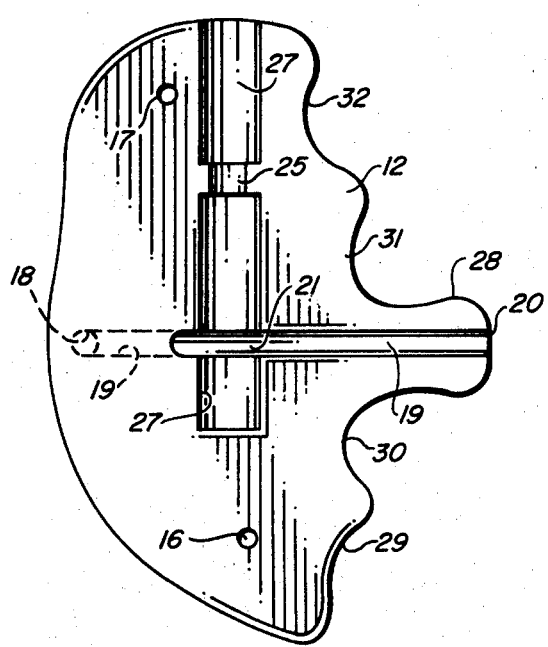
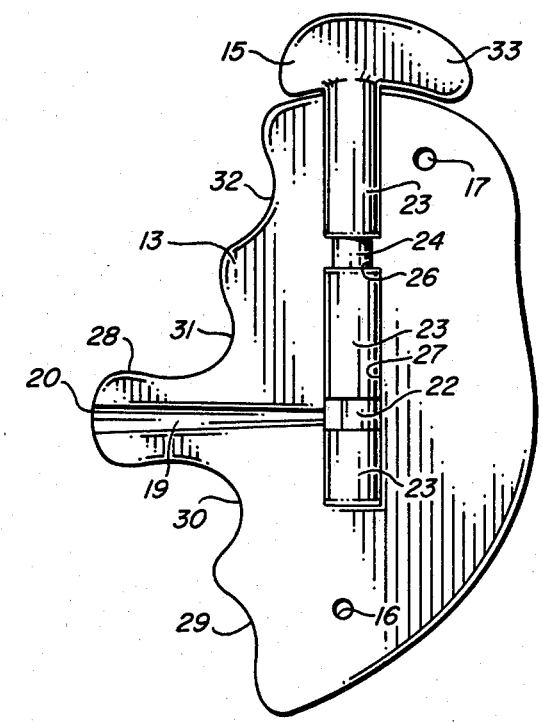

DOG LEASH

BACKGROUND OF THE INVENTION

This application is a continuing application of abandoned patent application Ser. No. 06/063,661, filed Sept. 10, 1979, and copending patent application Ser. No. 06/199,439, filed Oct. 22, 1980, both abandoned.

This invention relates to a leash device.

More particularly, the invention concerns a leash device of the type used in the training and handling of a canine.

In a further aspect, the invention concerns a leash device which adjustably offers the operator a variety of length settings at which a dog may be walked or trained.

Among the leash devices of the prior art utilizing adjustable leash lengths are U.S. Pat. No. 4,165,713 (Brawner et al) Illustrating a retractable leash line which is stored on a spring-biased rotatable reel, U.S. Pat. No. 2,250,171 (H. A. Wilkins), also illustrating a retractable leash on a rotatable reel and having a longitudinally movable brake shoe for contacting and braking the leash winding, U.S. Pat. No. 2,776,644 (R. E. Fontaine), another retractable leash comprising a spring-controlled reel, U.S. Pat. No. 3,937,418 (Critelli), another retractable leash stored internally on a spring-loaded wheel, the winding wheel being able to be selectively positioned or blocked, and British Pat. No. 1,546,235 (P. M. Nicholson), again showing a retractable leash coiled within a cylindrical housing, which retractable leash is controlled by a spiral coaxial spring and may be stopped by a toothed wheel.

SUMMARY AND OBJECTS OF THE INVENTION

It is the primary object of the present invention to provide an improved leash device not having the disadvantage of including the rotatable reels of the prior art.

Another object of the present invention is the provision of a leash device adapted for adjustability while controlling a dog being walked or trained.

Still another object is to provide a leash device which overcomes the problems of the prior art and the use of which makes it possible to fully control the dog or other pet during the time in which the mechanical adjustment of leash length is taking place.

Yet still another object of the present invention is the provision of a leash device of the above type which is relatively inexpensive to manufacture, and which has a high degree of durability and serviceability.

Briefly, to accomplish the desired objectives of the present invention in accordance with a preferred embodiment thereof, there is provided, in a leash device, a leash line and a housing through which the leash line passes and which is arranged to lodge in the palm of a hand. The housing comprises a leash line entrance opening, a leash line exit opening, and a leash line passageway between the entrance opening and the exit opening. The leash line passageway comprises a bearing surface for the leash line. Within the housing and adjacent the bearing surface is a variable mechanical compression means for compressing the leash line against the bearing surface. Outside the housing and adjacent thereto is a mechanical control means for controlling the compression of the variable mechanical compression means. The leash line thereby may pass through the housing in either direction by passing through the entrance opening, then through the passageway adjacent the bearing surface and the variable mechanical compression means, then out of the housing through the exit opening. The exit opening may comprise a nipple structure to protect the fingers from rope burn and the housing may be made of two separate longitudinal members to be fastened together.

Further, according to a highly preferred embodiment of the present invention, the variable mechanical compression means comprises a rotatable substantially-cylindrical member including a cam structure for compressing the leash line against the bearing surface upon rotation of the rotatable substantially-cylindrical member. In a further preferred embodiment the mechanical control means comprises a thumb-operated lever at one end of the rotatable substantially-cylindrical member for rotating the same upon rotation of the thumb-operated lever. Further preferred embodiments include a bearing between the housing and the rotatable substantially-cylindrical member to restrain the rotatable substantially-cylindrical member from longitudinal movement in the housing and a preferred embodiment in which the thumb-operated lever extends in a opposed direction to that of the nipple structure and is rotatable in opposed directions for the purpose of opening and closing, respectively, the variable mechanical compression means.

BRIEF DESCRIPTION OF THE DRAWINGS

Further and more specific objects and advantages of the present invention will become readily apparent to those skilled in the art from the following detailed description thereof taken in connection with the drawings, in which:

FIG. 1 is a pictorial view illustrating a preferred embodiment of the present invention;

FIG. 2 is a sectional view of the preferred embodiment of the present invention through the section 2—2 of FIG. 1;

FIG. 3 is a sectional view of the illustrated embodiment through the section 3—3 of FIG. 2;

FIG. 4 is a sectional view of the illustrated embodiment through the section 4—4 of FIG. 2; and FIG. 5 is a pictorial view illustrating the cylindrical member and thumb-operated lever of the present invention.

DETAILED DESCRIPTION OF THE PREFERRED EMBODIMENT

Turning now to the drawings in which the reference numerals indicate corresponding elements throughout the several views, FIG. 1 illustrates the preferred embodiment of the leash device of the present invention, including housing 11 consisting of longitudinal members 12 and 13, leash line 14, and thumb-operated lever 15. Fastening devices 16 and 17, say screws, serve to hold longitudinal members 12 and 13 together to form housing 11.

Referring to FIGS. 2, 3, 4, and 5, the space in housing 11 for for leash line 14 is provided by leash line entrance opening 18, leash line passageway 19 and leash line exit opening 20. Located in passageway 19 is bearing surface 21 against which leash line 14 may be compressed by cam 22 when rotatable substantially-cylindrical member 23 is rotated to an appropriate position by the movement of thumb-operated lever 15.

Rotatable substantially-cylindrical member 23 includes a bearing portion 24 of smaller diameter than member 23 which, in combination with ridge 25 of longitudinal member 12 of housing 11 and ridge 26 of longitudinal member 13 of housing 11, keeps rotatable substantially-cylindrical member 23 in place in housing 11 after the fastening of devices 16 and 17. Cylindrical bearing faces 27 of longitudinal members 12 and 13 of housing 11 serve to support rotatable substantially-cylindrical member 23 in housing 11. Housing 11 further includes nipple structure 28, of sufficient length to keep the hand and fingers of the user of the present invention free from injury such as rope burns. Also included in housing 11 are finger grooves 29,30,31, and 32 to assist the supporting of housing 11 in the palm of the user's hand. Finger grooves 29 and 30 are situated above nipple structure 28, thus permitting the user the support of two fingers on either side of nipple structure 28 which nipple structure 28 protects those fingers from injury such a rope burn.

In a manner which is well known in the art, it is highly preferred that cam 22 be so located that its closest approach to bearing surface 21 (to compress leash line 14) and the location of its furthest distance from bearing surface 21 are reached when the rear edge 33 of the thumb-operated lever 15 is pushed to the left and right, respectively, of the user, preferably by the user's thumb.

It is seen from the foregoing description, when leash line 14 at its end 34 is attached to the collar of the pet, that end 35 of leash line 14 will be free to be held by the free hand of the user. Thus, while the user, with the thumb of one hand, operates thumb-operated lever 15 to open the contact of cam 22 and begin end 35 of leash line 14, can control the pet simultaneously while adjusting the length of end 34 of leash line 14. When the proper leash line length is reached, the user merely places thumb-operated lever 15 into its opposed position in which cam 22 and bearing surface 21 bear upon leash line 14 to firmly hold leash line 14 in place. It is seen, also, that this arrangement converts tension along leash line 14 from pulls in direction 34 to tighten the compression of cam 22 upon bearing surface 21, thus holding leash line 14 even more tightly without continuous thumb pressure on the part of the user. And, it is seen that the placement of entrance opening 18 entirely in longitudinal member 12 accomplishes not only assistance with line compression, but also keeps leash line 14 out of the way of the user's hand.

It is further seen that the construction of the present invention permits a device of the present type with essentially only one moving part, with great advantages in sturdiness and cost.

The present embodiment of this invention is to be considered in all respects as illustrative and not restrictive the scope of the invention being indicated by the appended claims rather than by the foregoing description; and all changes which come within the meaning and range of equivalency of the claims are therefore intended to be embraced thereby.

I claim:

1. In a leash device:
   (a) a leash line having an entrance end and an exit end;
   (b) a housing constructed and arranged to lodge in the palm of a user's first hand;
   (c) said housing comprising a leash line entrance opening situate in a first surface of said housing facing away from the palm of a user's first hand, a leash line exit opening situate in a second surface of said housing facing away from the user, and a leash line passageway between said entrance opening and said exit opening, said leash line passageway comprising a bearing surface for said leash line;
   (d) within said housing, adjacent said bearing surface, variable mechanical compression means for compressing said leash line against said bearing surface;
   (e) outside said housing and adjacent thereto, mechanical control means for controlling the compression of said variable mechanical compression means;
   (f) said leash line being constructed and arranged to pass through said housing in either direction by passing through said entrance opening, then through said passageway adjacent said bearing surface and said variable mechanical compression means, then out of said housing through said exit opening; and
   (g) said leash device being constructed and arranged so that a user's second hand, by controlling said entrance end of said leash line, will control an animal connected to said exit end of said leash line when said mechanical control means is in a non-compression position.

2. The leash device of claim 1 wherein said exit opening comprises a nipple structure sufficiently long to protect a hand and fingers holding said housing from injuries through contact with said leash line.

3. The leash device of claim 2 wherein said variable mechanical compression means comprises a rotatable substantially-cylindrical member including a cam structure constructed and arranged to compress said leash line against said bearing surface upon rotation of said rotatable substantially-cylindrical member.

4. The leash device of claim 3 wherein said mechanical control means comprises a thumb-operated lever at one end of said rotatable substantially-cylindrical member constructed and arranged for rotation of said rotatable substantially-cylindrical member upon rotation of said thumb-operated lever.

5. The leash device of claim 4 wherein said housing includes external finger grooves, a pair of said finger grooves being situated to one side of said nipple structure and a pair of said finger grooves being situated to the opposed side of said nipple structure.

6. The leash device of claim 5 wherein said housing includes two longitudinal members adapted to be fastened together.

7. The leash device of claim 6 wherein said entrance opening is entirely situated in only one of said longitudinal members of said housing.

8. The leash device of claim 7 wherein said thumb-operated lever extends in a opposed direction to that of said nipple structure and is rotatable in opposed directions for the purpose of opening and closing, respectively, said variable mechanical compression means.

9. The leash device of claim 8 wherein said rotatable substantially-cylindrical member is located in said housing offset to one side of said housing.

10. The leash device of claim 9 including a bearing between said housing and said rotatable substantially-cylindrical member to restrain said rotatable substantially-cylindrical member from longitudinal movement in said housing.

* * * * *